United States Patent [19]

Houston

[11] 4,006,754
[45] Feb. 8, 1977

[54] FLUID PRESSURE OPERATED VALVE

[76] Inventor: William T. Houston, Star Rte. 93B, Oak Drive off Bald Rock Road, Berry Creek, Calif. 95916

[22] Filed: May 19, 1975

[21] Appl. No.: 578,487

[52] U.S. Cl. .......................... 137/614.21; 251/368; 251/298; 251/61
[51] Int. Cl.² ...................................... F16K 31/126
[58] Field of Search ...................... 251/61, 298, 59; 137/614.21, 614.11, 61.1

[56] References Cited

UNITED STATES PATENTS

| 692,172 | 1/1902 | Wescott et al. | 137/614.21 X |
|---|---|---|---|
| 2,660,946 | 12/1953 | Peple, Jr. | 251/61 |
| 2,676,609 | 4/1954 | Pfarrer | 251/25 X |
| 2,704,648 | 3/1955 | Cobb | 251/61 |
| 3,445,085 | 5/1969 | Eckel et al. | 251/368 X |
| 3,552,422 | 1/1971 | Michelson | 137/614.21 X |
| 3,840,177 | 10/1974 | Osheroff | 251/61.1 X |

OTHER PUBLICATIONS

IBM Technical Disclosure Bulletin, vol. 7, No. 5, Oct. 1964, p. 367 (Michelitsch).

*Primary Examiner*—Arnold Rosenthal
*Attorney, Agent, or Firm*—Bauer, Amer & King

[57] ABSTRACT

A fluid pressure operated valve includes a housing into which fits an expansible membrane. The housing is formed with an input aperture and an output aperture each respectively closable by one of a pair of movable flaps. The membrane is coupled to the fluid pressure the application of which causes the expansion of the membrane. This expansion can be controlled to provide on the one hand, regulation of the flow through the valve. Or, on the other hand, the expansion can drive the flaps fully across their respective apertures and cause the membrane to sealingly engage the housing interior to block fluid flow through the valve.

This Abstract is neither intended to define the invention nor to limit its scope.

2 Claims, 3 Drawing Figures

U.S. Patent     Feb. 8, 1977     4,006,754

FLUID PRESSURE OPERATED VALVE

FIELD OF THE INVENTION

This invention relates to a valve and more particularly to a fluid pressure operated flap valve.

BACKGROUND OF THE INVENTION

Nearly all conventional valves such as gate valves, ball seat valves and plug operated valves employ driven threaded members. Since these members effect the large mechanical advantage necessary to move the valve element against what is often times a considerable hydrostatic pressure, they are generally characterized by their relative slowness in operation. That is, from full opened to full closed, the control element — usually a threaded stud or worm gear — requires significant movement or rotation that tends to make these valves comparatively slow acting.

Slow acting valves are ill suited for emergency control. Hence, it is not uncommon to find some pipe systems with two valve schemes. One scheme is used for normal control operation and the other scheme is for emergency control. The latter typically is of the "go" or "no go" variety with no intermediate positioning. This last mentioned emergency scheme might be an explosively operated gate valve designed to nearly instantaneously imposition a blade across the pipe and block fluid flow. Of course, other motive means are available for emergency operation such as solenoids and pressure operated devices but being for emergency control most are not capable of controlling or regulating fluid flow in the conventional sense. This birfurcation control has, in certain critical pipe designs, lead to the requiring of both regimes with its attendant redundancy and cost. For example, in an oil pipeline transmission system such as the Alaska pipeline the nature thereof mandates many hundreds of yards if not miles between pumping stations. For the most part the pipeline, which is forty-eight inches in diameter, remains unattended. A break in this pipeline could do serious environmental damage if not quickly controlled. Thus it is desirable to provide an effective, reliable and low cost valve arrangement that could be closely spaced along the line and that has nearly instantaneous shut off capabilities. Yet conventional valving arrangements appear other than adapted for this purpose.

Then, too, in drilling for oil an effective and reliable valve arrangement is required that affords a nearly instantaneous shutting down or closing of the drill pipe or casing. Such a valve arrangement is needed because often times when the well is "struck" the fluid blows out under tremendous pressure. As the gas or oil expands through the well head into the ambient atmosphere, it atomizes increasing the fluid's surface area. In the oxygen rich ambient atmosphere the expanded gas is prone to ignite and often does. Oil and well fires are notorious for their intensity, they are a hazard to life and property and the blow out, whether ignited or not, pollutes the environment. Hence it is highly desirable to effect a nearly instantaneous shutting down of such a "wild" gas or oil flow to reduce and nearly eliminate the fire hazard.

Yet conventional valving apparatus is other than adapted for reliable and rapid flow stoppage because of the severity of the drilling environment. Obviously most, if not all of the drill piping is below ground thus the emergency valve must operate in a dirt and mud soaked environment. Irrespective of the seals employed, abrasive particulates find their way into the critical valve control elements often times leading to faulty operation if not total immobilization. Then again, the vibrations and stresses placed on both piping and valves during normal drilling effects a rapid fatigue of their structural elements, not to mention the shock loading and vibrational intensity reached when the fluid from a high pressure gas or oil pocket "blows out" through the drill pipe and well head. These unique, albeit severe loading factors have made conventional shut-off valves unreliable at best.

OBJECTS OF THE INVENTION

It is therefore an object of the present invention to provide a reliable, fast acting shut-off valve to control the flow through piping of an oil or gas transmission line.

It is another object of the present invention to provide a fast acting flap valve the operation of which is devoid of threaded studs, worm gears, plunger rods and the like.

It is a further object of the present invention to provide a fluid pressure operated valve particularly adapted to regulate the flow of fluids under high pressure.

It is a still further object of the present invention to provide a fluid pressure operated valve wherein the drive element is a pressurized elastomeric member with means provided to isolate the hydrostatic head in the line from bearing directly on the elastomer.

It is yet another object of the present invention to provide a control element for fluids that affords complete isolation across the pipe interior when fully closed, employs a minimal number of moving parts so that it is simple in design, inexpensive to manufacture and reliable.

Other objects and features of the present invention will become apparent from the following detailed description considered in connection with the accompanying drawings. It is to be understood however that the drawings are designed for purposes of illustration only and not as a definition of the limits of the invention for which reference should be made to the appending claims.

BRIEF DESCRIPTION OF THE DRAWINGS

In the drawings wherein the same reference numeral denotes the same element throughout the several views.

DETAILED DESCRIPTION OF THE DRAWINGS

In general the present valve is characterized by a valve housing formed with an input and output aperture. A pair of flap valves are pivotably hinged in the housing with a respective one thereof suspended adjacent and operable to close an associated input and output aperture. An elastomeric drive membrane or bag biases the flaps to provide the driving force for same. The bag communicates with a remote source of high pressure fluid to cause the expansion thereof in and across the housing interior as it drives the flaps and in combination therewith regulate the flow through or shut the valve. Thus, the rate of bag expansion and flap movement can be controlled on the one hand to provide conventional flow regulation, and on the other hand, the bag can be filled with nearly explosive force to cause the almost instant blockage of fluid flow.

Figure 1:
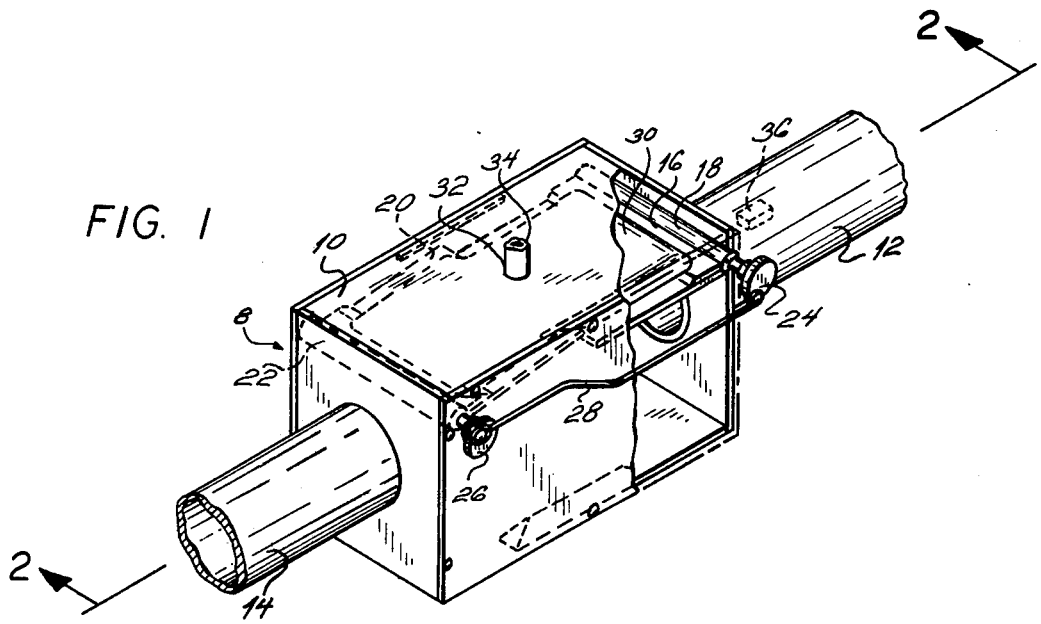
FIG. 1 is a perspective view of the present invention with part broken away for purposes of clarity.
Figure 2:
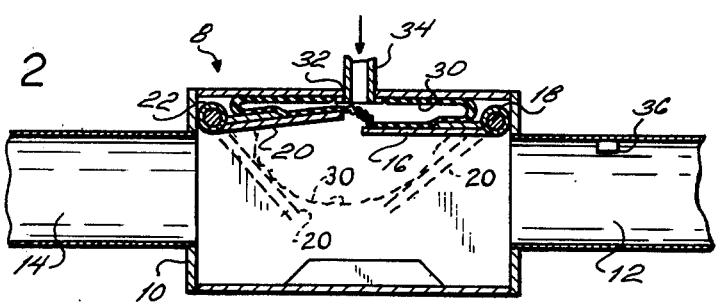
FIG. 2 is a view along the line 2-2 of FIG. 1 seen in direction of the arrows and showing in phantom a flap position assumed during conventional flow regulation; and, FIG. 3 shows the valve of FIG. 2 with elastomeric drive element fully displacing the flaps and engaging the housing interior to close the valve.
Figure 3:
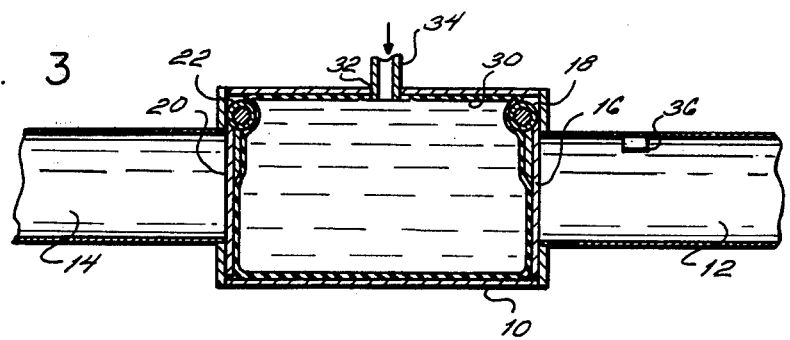

In detail now and referring to FIGS. 1, 2 and 3 there is shown the inventive valve with the same generally indicated by reference numeral 8. The valve includes a housing 10 having an inlet 12 and an outlet 14 both of which communicate with the housing interior. An input covering flap valve 16 is pivotably suspended within and across housing 10 adjacent input 12 by means of a hinge pin 18. Similarly, an output covering flap valve 20 is pivotably suspended within the housing adjacent output 14 by means of a hinge pin 22. In the construction shown, each flap valve 16 and 20 is fixably attached to its respective pin 18 and 22 with the ends of the pins rotatably journaled in the associated housing sides. One end of each journaled pin 18 and 22 extends through a side of the housing and is attached to one of a respective pair of cams 24 and 26.

Of course this method of suspending the flaps is illustrative only as many other constructions are available. For example, the pins might be fixed in one or both housing sides and the associated flap designed to pivot thereon. Alternatively, the flap might be suspended merely by a deformable element such as a plastic or nylon curtain or resilient metallic sash. The only criteria for the suspension of the flap valves is that they be able to cover their respective inputs and outputs during operation of the valve as described below.

Preferably, a pivotal link mechanism 28 couples the cams with the latter phased on each of their respective pin ends so that the flaps are synchronized or displaced in unison. A fluid tight membrane 30 is positioned within housing 10 and as seen in FIG. 2, the membrane is placed between the upper surface of the flaps and the associated housing wall that is in confronting relation thereto. Hence, when the valve is full open as seen in FIG. 1, the membrane or bag is stored substantially remote from the fluid flow through the housing. In high pressure systems where considerable pressure is anticipated or is flowing through valve 8, it is preferable to secure a respective portion of bag 30 to its engaging face of each flap. Typically, this is to be accomplished by epoxy bonding contiguous portions of the bag to its associated flap side and in so doing insure positive action of the flaps during their operation as will be explained shortly.

An aperture 32 is formed in this housing wall that is contiguous to bag 30. Preferably a conventional pressure fitting 34 is secured in aperture 32. One end of fitting 34 receives the input end of pressure bag 30 while the other end of the fitting is coupled to a remote source of pressured fluid (the remote pressure source not shown).

Since elastomeric member or bag 30 provides the driving force for flaps 16 and 20 some consideration should be given its construction. Generally speaking, elastomeric means both natural and synthetic materials. Normally, the fluid being pumped through housing 10 and the environment in which the housing is in dictate whether a natural or synthetic material is chosen for composition of bag 30. Since vulcanized natural rubber will stretch to approximately ten times its length and at this point bear a load of approximately 10 tons per square inch, for conventional water systems, natural rubber is the preferred choice for membrane 30. On the other hand, various synthetics such as Neoprene, Nitrile rubber, Butyl and Thiokol will be chosen for compatability (resistance to chemical attack and environmental operability) with the pipeline fluid. For example, where oil or gas is being pumped through housing 10, Nitrile rubber, because of its resistance to oils and solvents will normally represent an adequate trade off for the composition of membrane 30.

Operation of the inventive valve can best be understood with reference to FIG. 3 and comparisons to FIGS. 1 and 2. In FIG. 1, membrane 30 is in a contracted or unpressurized position placing flaps 16 and 20 into a "free wheeling" configuration whereby the hydrostatic head in input line 12 drives input flap 16 into its upward and fully open mode. Since flap 20 is latched to movement of flap 16, the former is likewise placed and held upwards by operation of link 28 being driven by cam 24 and driving cam 26.

If regulation of the flow through the housing is desired, a controlled amount of pressurized fluid is pumped or admitted into membrane 30 through fitting 34. This effects expansion of the bag which drives flap 16 and 20 downwardly when looking at FIG. 2, causing the same to come to rest at some intermediate position which is indicated in phantom or dotted lines in the last mentioned figure. Hence regulating the admission and pressurization of membrane 30, governs the restriction across and volumetric flow rate through valve 8.

In the event that a complete shut off is required, and now referring to FIG. 3, air bag 30 is pressurized through fitting 34 as before noted. When the internal pressure in bag 30 overcomes the force of the hydrostatic head in input line 12, the bag drives flap 16 and hence flap 20 across their respective input and output apertures to substantially close the same. Continued application of pressure from the remote source to the interior of bag 30 drives it into expanding engagement with the interior of housing 10 completely blocking any pipeline fluid leakage past flap 16. It will be noted that flap 16 is impositioned between the hydrostatic head in input line 12 and bag 30. Hence, the force of the fluid in the pipeline is distributed across the rigid face of flap 16 substantially isolating bag 30 from direct fluid contact thereby eliminating localized deformation of the bag and erratic if not leaky operation. Of course, the time required to effect a complete bag expansion and fluid blockage across the input and output will depend on the pressure differential across the membrane and flap. By rapidly pressurizing the interior of bag 30 over that in line 12, for example, by explosive rupture of a diaphram (the diaphragm not shown) that is isolating the remote high pressure source from the interior of bag 30, a nearly instantaneous closing of the valve can be achieved. To illustrate, if housing 10 is coupled across a wall head, a pressure sensitive transducer 36 might be operatively positioned in input line 12 to sense the pressure front that proceeds the onward rush of underground gas or oil as it blows out through pipe 12. The output of transducer 36 might be coupled to the aforesaid rupture diaphram that is across the remote high pressure line feeding fitting 34. The rupture of the diaphragm can be set to "trip" at a specific output level of transducer 36 corresponding to the abnormally high pressure front associated with a "wild" well. Since the remote high pressure source is at many times the expected "worst case" pressure of the wild well, the application of the remote high pressure source into membrane 30 nearly instantaneously inflates the same. This nearly instantaneous inflation drives the respective flaps across their associated apertures, drives membrane 30 into an engaging configuration against the walls of housing 10 and thus effects complete isolation of input line 12 from output line 14.

While linkage 28 has been shown external to the housing for purposes of clarity, it is to be understood that in those applications where valve 8 is buried, the linkage will be enclosed and isolated from the surrounding environment. Then, too, other means are available to coordinate movement of flaps 16 and 20. These means might include gears, chains and sprockets, levers and other arrangements available to those in the art.

While only a few embodiments of the present invention have been shown and described, it is to be understood that many changes and modifications can be made hereto without departing from the spirit and scope hereof.

What is claimed is:

1. A fluid pressure operated valve comprising:

a. a housing formed with an input aperture and an output aperture;
   b. flap means movable in said housing and adapted to close said input and output apertures, said flap means comprising two flaps adapted for respective imposition across said input and output apertures, said flaps when imposed across said apertures forming in combination with said housing an uninterrupted enclosure;
   c. an elastomeric expansible means positioned in said housing adapted to be coupled to a source of fluid pressure and selectively operable to expand and tightly seal against the interior of said housing thereby regulating the flow through the valve and to simultaneously drive said flaps into closing engagement across their respective input and output apertures, said expansible means in its fully expanded condition being contained by the enclosure formed by said flap means and said housing; and
   d. means to synchronize the movement of said flaps, said synchronizing means comprising crank means driven by said flaps and link means coupling said crank means to effect synchronous movement thereof.

2. The valve of claim 1 wherein said elastomeric bag comprises material selected from the group consisting of Neoprene, Nitrile rubber and Butyl.

* * * * *